United States Patent
Huang et al.

(10) Patent No.: US 8,027,474 B2
(45) Date of Patent: Sep. 27, 2011

(54) METHOD AND SYSTEM FOR SECURE DATA AGGREGATION IN WIRELESS SENSOR NETWORKS

(75) Inventors: Shih-I Huang, Hsinchu (TW); Shiuh-Pyng Shieh, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 1007 days.

(21) Appl. No.: 11/976,158

(22) Filed: Oct. 22, 2007

(65) Prior Publication Data

US 2008/0247539 A1 Oct. 9, 2008

Related U.S. Application Data

(60) Provisional application No. 60/907,508, filed on Apr. 5, 2007.

(51) Int. Cl.
 *H04L 9/28* (2006.01)
(52) U.S. Cl. ...................................... 380/270
(58) Field of Classification Search ............... None
See application file for complete search history.

(56) References Cited

U.S. PATENT DOCUMENTS

| | | | |
|---|---|---|---|
| 7,321,659 B2 * | 1/2008 | Hall et al. | 380/37 |
| 7,383,230 B2 * | 6/2008 | Wolff | 705/53 |
| 2006/0116170 A1 * | 6/2006 | Brahmbhatt et al. | 455/560 |

OTHER PUBLICATIONS

Acharya, M., et al., "Secure Comparison of Encrypted Data in Wireless Sensor Networks", Apr. 25, 2005, Third International Symposium on Modeling and Optimization in Mobile, Ad Hoc, and Wireless Networks, 2005. WIOPT 2005.*
Girao, Westhoff and Schneider, "Concealed data aggregation in wireless sensor networks," ACM WiSe04—poster; in conjunction with ACM MOBICOM 2004, Oct. 2004.*
Girao, Westhoff and Schneider, "Concealed data aggregation for reverse multicast traffic in wireless sensor networks," 40th International Conference on Communications, IEEE ICC 2004, Ma.*
Huang, Shih-I, Using Self Data Aggregated Sensor Networks to Achieve Higher Security in E-Society (Extended Abstract), Industrial Technology Research Institute, Hsinchu, Taiwan, Dept. of Comp. Sci. and Info. Eng., National Chiao Tung Univ., Hsinchu, Taiwan (7 pp.).

* cited by examiner

*Primary Examiner* — Minh Dinh
*Assistant Examiner* — David Le
(74) *Attorney, Agent, or Firm* — Finnegan, Henderson, Farabow, Garrett & Dunner, LLP

(57) ABSTRACT

A method for transmitting sensed data in a wireless sensor network including multiple sensors, includes: encrypting the sensed data with an encryption key and a verification key to generate encrypted data in each of the multiple sensors that senses data; wirelessly receiving the encrypted data from the multiple sensors; determining that the sensed data from one of the multiple sensors is different from the sensed data from others of the multiple sensors without decrypting the encrypted data; and transmitting the encrypted sensed data determined to be different.

20 Claims, 12 Drawing Sheets

430

| Role | Pre-Installed Elements |
|---|---|
| Sensor Node | $SID_i$, $g$, $K_i^{EK}(0)$, and $K_i^{Vk}$ |
| Aggregator | $g$ and $K_i^{Vk} \oplus K_j^{Vk}$ $\forall$ $i \neq j$ |
| Remote Database | $g$ and $K_i^{Vk}$ $\forall$ $i$ |

Fig. 4C

METHOD AND SYSTEM FOR SECURE DATA AGGREGATION IN WIRELESS SENSOR NETWORKS

RELATED APPLICATIONS

This application is based upon and claims the benefit of priority from Provisional Application No. 60/907,508, filed Apr. 5, 2007, the entire contents of which are incorporated herein by reference.

FIELD OF THE INVENTION

This invention pertains in general to methods and systems for data transmission in sensor networks and, more particularly, to methods and systems for transmitting sensed data in wireless sensor networks.

BACKGROUND OF THE INVENTION

Wireless sensor networks (WSNs) are gaining worldwide popularity due to their broad applications in different environments, including office, home, and hostile areas. Such WSNs may present a meaningful and efficient solution to some challenging problems, such as building safety monitoring, vehicle tracking, wildlife tracking, and environmental surveillance. Advances in micro electromechanical system technology (MEMS), combined with radio frequency (RF) circuits and low cost, low power digital signal processors (DSPs), improve feasibility of these sensor networks.

A WSN may consist of multiple sensor nodes that sense data of interest and transmit the sensed data, directly or indirectly, to a remote database for further processing. For example, FIG. 1 shows a Wireless Integrated Network Sensor Next Generation (WINS NG) network 100 corresponding to FIG. 8 of U.S. Pat. No. 7,020,701. Referring to FIG. 1, network 100 includes nodes 102, gateway nodes 104, a server 106, and web assistants or node control web or browser pages (not shown). In the network 100, the sensor nodes 102 are constructed in a layered fashion to enable use of standard tools, facilitate real-time operating systems issues, promote adaptability to unknown environments, simplify reconfiguration, and enable lower-power, continuously vigilant operation.

Sensor nodes are usually power constrained and have limited computational and communication power in a WSN. Therefore it may be desirable to maximize lifetime of the sensor nodes under this constraint. The lifetime of the sensor nodes depends on effective energy saving strategies such as sensor scheduling and in-network information processing to reduce the amount of sensed data transmitted to a remote database.

One exemplary in-network information processing technique is data aggregation, which has been utilized as a paradigm for wireless routing in sensor networks. Since sensor nodes are usually energy constrained, it may be inefficient and power consuming for all of the sensor nodes to transmit sensed data directly to a remote database for processing. Data sensed by neighboring sensor nodes is often highly correlated and hence redundant. In addition, the amount of the sensed data in a WSN of large size is usually very large for a remote database to process. Data aggregation is a technique that can aggregate data at neighboring sensor nodes or intermediate nodes, which may reduce the amount of the sensed data transmitted to the remote database. As a result, data aggregation can save energy and improve bandwidth utilization for WSNs.

Two commonly used sensor network architectures are self-organized WSNs and clustered WSNs. FIG. 2 illustrates a conventional self-organized WSN 200. With reference to FIG. 2, each sensor node 202-1, 202-2, . . . , 202-M (M is the total number of sensor nodes in the WSN 200) senses certain parameters, such as temperature, pressure, or humidity, of an environment, and transmits data to a remote database 204 by radio communication. The data may be transmitted to the remote database 204 directly or indirectly.

Data aggregation in the WSN 200 may be performed at different sensor nodes along a multi-hop path (e.g., the sensor node 202-3→the sensor node 202-2→the sensor node 202-1). By aggregating data at the different sensor nodes in the multi-hop path, data aggregation can help eliminate data redundancy and minimize data transmissions to the remote database 204. However, high latency may be involved in data transmission to the remote database 204 via the multi-hop path. In addition, although the self-organized WSN 200 is easy to construct, the sensor nodes 202-1, 202-2, . . . , 202-M may be highly power consuming in data transmission, which may result in a short operation lifetime for the WSN 200.

As mentioned above, it may be inefficient for all of the sensors to transmit sensed data directly to the remote database for processing, especially in a WSN of large size. To save energy and improve bandwidth utilization, the WSN can be divided into non-overlapping clusters, wherein a cluster includes a group of sensor nodes and a local aggregator or a cluster head which aggregates data from all of the sensor nodes in its own cluster and transmits the aggregated data to the remote database. By aggregating data coming from different sensor nodes in the same cluster, data aggregation can help eliminate data redundancy and minimize data transmissions to the remote database. As a result, dividing the WSN into clusters and aggregating data can save energy and improve bandwidth utilization for the WSN.

FIG. 3 illustrates a conventional clustered WSN 300. With reference to FIG. 3, the WSN 300 is divided into non-overlapping clusters 302-1, 302-2, . . . , 302-N (N is the total number of clusters in the WSN 300) with a powerful node, an aggregator or a cluster head, 304-1, 304-2, . . . , 304-N in each cluster. Each sensor node 306-1, 306-2, . . . , 306-M (M is the total number of sensor nodes in the WSN 300) senses certain parameters, such as temperature, pressure, or humidity, of an environment, and transmits data to the one of the aggregators 304-1, 304-2, . . . , 304-N in its own cluster. Each aggregator 304-1, 304-2, . . . , 304-N then aggregates the data from the different sensor nodes in its own cluster (e.g., the aggregator 304-1 aggregates the data from the sensor nodes 306-1, 306-2, and 306-3 in the cluster 302-1) and wirelessly transmits the aggregated data to a remote database 308 for further processing. Because the aggregators 304-1, 304-2, . . . , 304-N can eliminate data redundancy and minimize data transmissions to the remote database 308, the clustered WSN 300 may have a longer operation lifetime compared to the self-organized WSN 200 in FIG. 2.

While data aggregation can help conserve energy resources by reducing data redundancy and improve bandwidth utilization, security issues may exist in WSNs. Such security issues include data secrecy and data privacy. In terms of data secrecy, sensed data should be protected from attacks, such as known-ciphertext attacks, known-plaintext attacks, and relay attacks, during data transmission. In terms of privacy, the sensed data should remain secret to aggregators. For example, each aggregator 304-1, 304-2, . . . , 304-N should not know contents of the sensed data received from any of the sensor nodes 306-1, 306-2, . . . , 306-M in its own cluster.

SUMMARY OF THE INVENTION

In accordance with the invention, there is provided a method for transmitting sensed data in a wireless sensor network including multiple sensors, the method comprising: encrypting the sensed data with an encryption key and a verification key to generate encrypted data in each of the multiple sensors that senses data; wirelessly receiving the encrypted data from the multiple sensors; determining that the sensed data from one of the multiple sensors is different from the sensed data from others of the multiple sensors without decrypting the encrypted data; and transmitting the encrypted sensed data determined to be different.

Also in accordance with the invention, there is provided a method for transmitting sensed data in a wireless sensor network including multiple sensors, multiple aggregators, and a remote database, the method comprising: dividing the wireless sensor network into non-overlapping clusters, each of the clusters including a group of the sensors and one of the aggregators; encrypting, in the group of sensors, data sensed by each of the sensors in the group with an encryption key and a verification key to generate separate encrypted data for each of the sensors in the group; determining, in the aggregator, that the sensed data from one of the sensors in the group is different from the sensed data from others of the sensors in the group without decrypting the encrypted data; and transmitting the encrypted sensed data, determined to be different, to the remote database for processing.

Further in accordance with the invention, there is provided a system for transmitting sensed data in a wireless sensor network including non-overlapping clusters, the system comprising: a group of sensors to sense data, in a cluster, each of the sensors that senses data configured to encrypt the sensed data with an encryption key and a verification key to generate encrypted data; an aggregator to wirelessly receive the encrypted data, in the cluster, the aggregator configured to determine that the sensed data from one of the sensors in the group of sensors is different from the sensed data from others of the sensors in the group of sensors without decrypting the encrypted data; and a remote database configured to wirelessly receive, from the aggregator, the encrypted sensed data determined to be different.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this application, illustrate embodiments of the invention and, together with the description, serve to explain the principles of the invention.

FIG. 4C shows a table illustrating elements that may be pre-installed in a WSN according to an exemplary embodiment.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent similar elements unless otherwise represented. The implementations set forth in the following description of exemplary embodiments consistent with the present invention do not represent all implementations consistent with the claimed invention. Instead, they are merely examples of systems and methods consistent with aspects related to the invention as recited in the appended claims.

Embodiments consistent with the present invention may utilize a clustering scheme to divide a wireless sensor network (WSN) into non-overlapping clusters, with a cluster including an aggregator and a group of sensor nodes. The group of sensor nodes sense certain parameters, such as temperature, pressure, or humidity, of their environment, and wirelessly transmit data to the aggregator in their own cluster. The aggregator in the cluster aggregates the data from the group of sensor nodes. In addition, the aggregator has a wireless transceiver that can transmit the aggregated data directly to a remote database for further processing. In one embodiment, the respective sensor nodes of a group of sensor nodes each utilize a lightweight encryption method to encrypt the data before transmission to the aggregator. The lightweight encryption method may use techniques to reduce heavy computation burden on the sensor nodes. For example and without limitation, such lightweight encryption method may use exclusive OR operations and a hash function. The encryption may also provide data secrecy and privacy to support data aggregation.

Also in embodiments consistent with the present invention, data aggregation techniques may be utilized to conserve energy resources by reducing data redundancy and to improve bandwidth utilization and resource efficiency. In one embodiment, a pair-wise data eliminating method is performed in the aggregator to find redundant data in encrypted data received from two sensor nodes in the group of sensor nodes without decrypting the received encrypted data. In addition, the pair-wise data eliminating method may be performed in the aggregator to find redundant data in multiple encrypted data from the group of sensor nodes by pairing off the encrypted data. By iteratively performing the pair-wise data eliminating method, redundant data in the multiple encrypted data from the group of sensor nodes can be eliminated.

Figure 1:
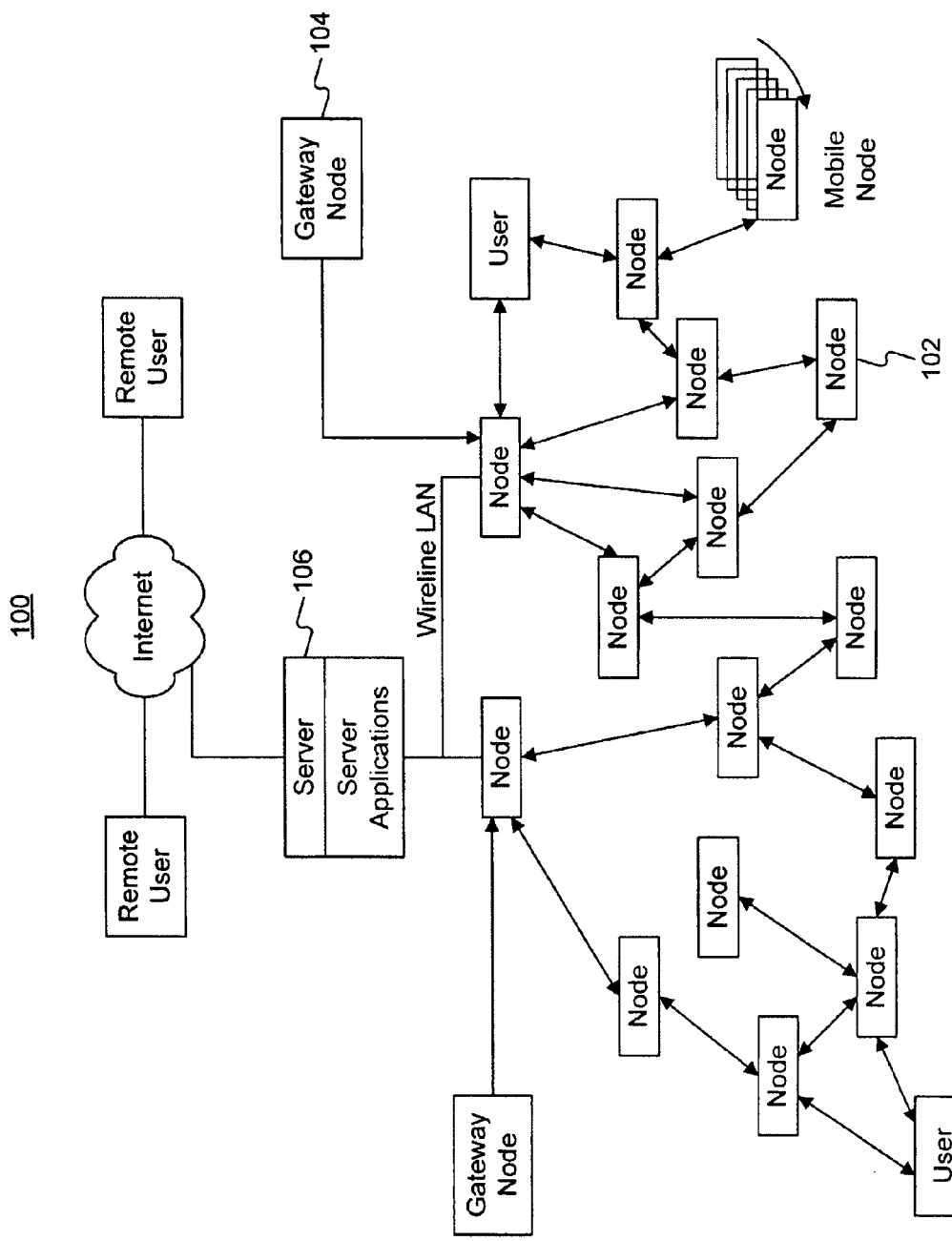
FIG. 1 shows a wireless sensor network according to the prior art.
Figure 2:
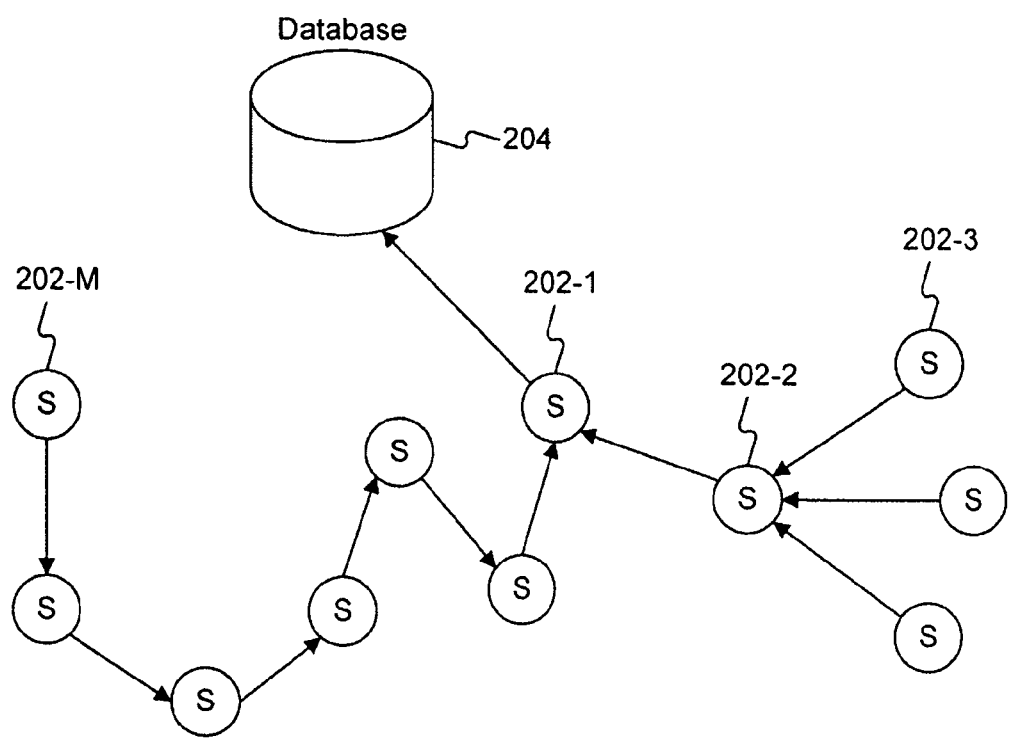
FIG. 2 illustrates a conventional self-organized WSN.
Figure 3:
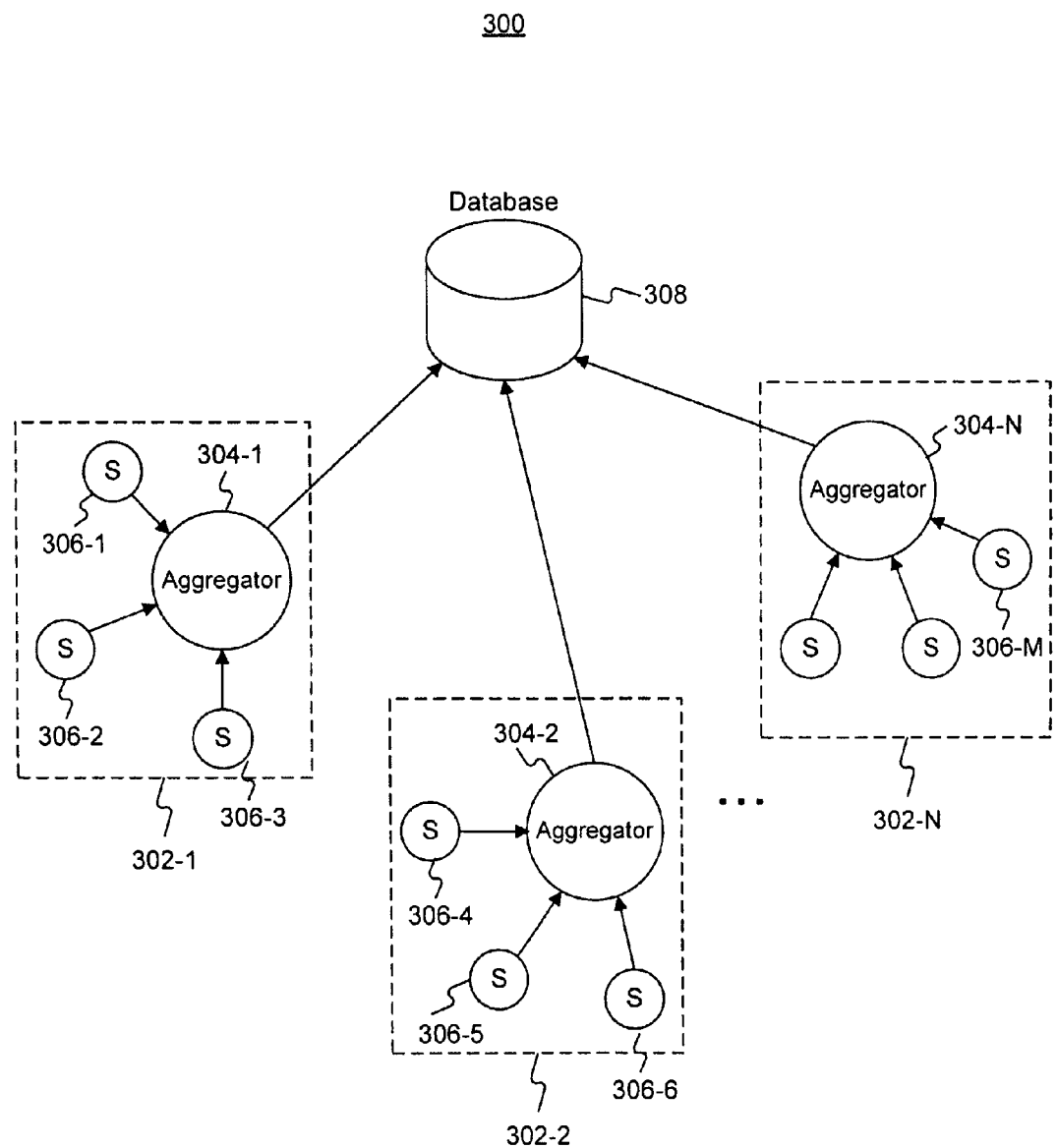
FIG. 3 illustrates a conventional clustered WSN.
Figure 4A:
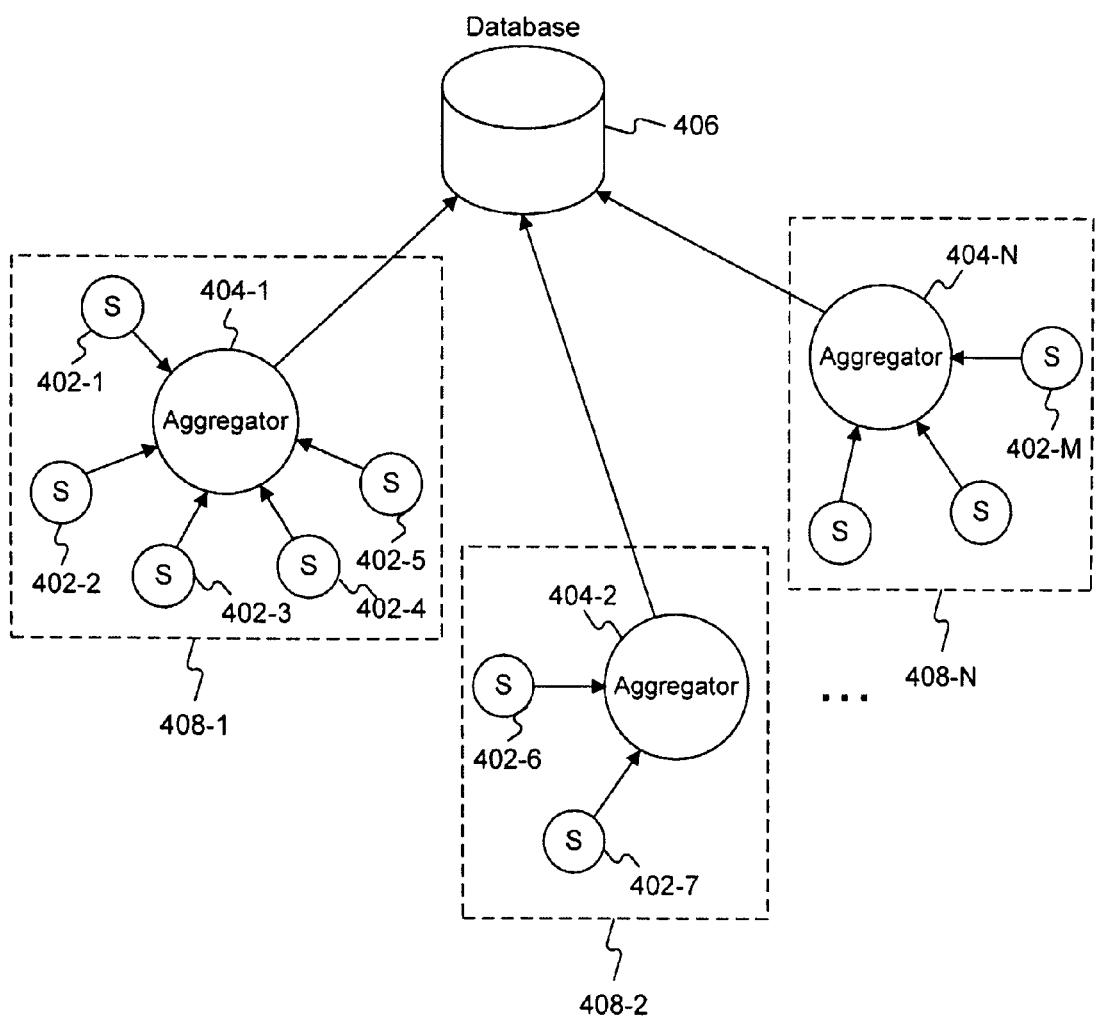
FIGS. 4A and 4B illustrate a system and method for secure encrypted-data aggregation in a WSN according to an exemplary embodiment.
Figure 4B:
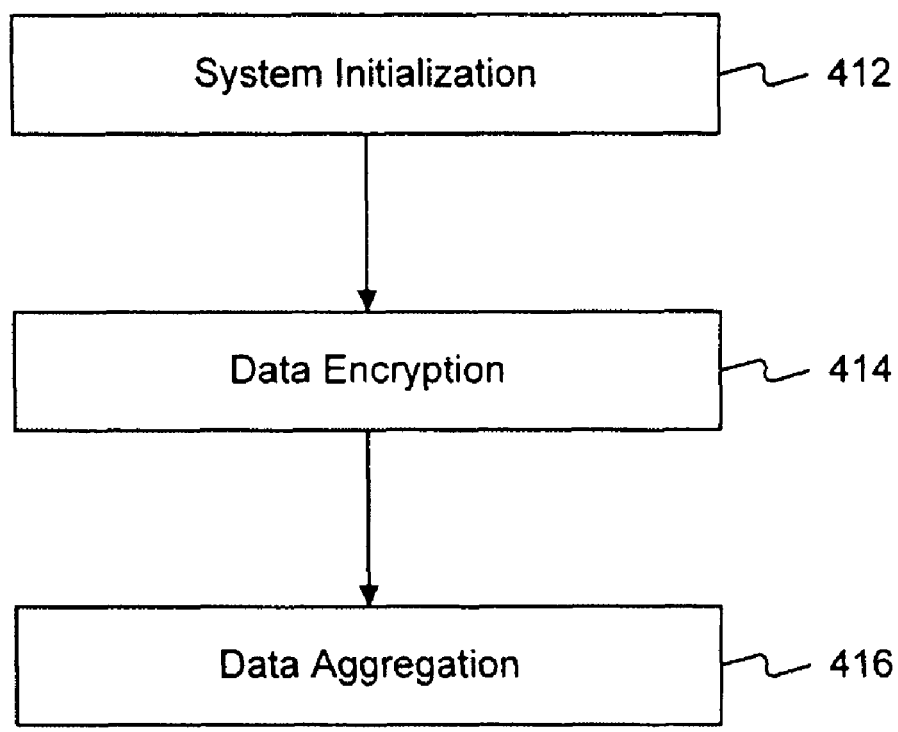

FIGS. 4A and 4B illustrate a system and method for secure encrypted-data aggregation in a WSN 400. With reference to FIG. 4A, a WSN 400 includes sensor nodes 402-1, 402-2, ..., 402-M (M is the total number of sensor nodes in the WSN 400), aggregators 404-1, 404-2, ..., 404-N (N is the total number of aggregators in the WSN 400), and a remote database 406, according to an exemplary embodiment. Each sensor node 402-1, 402-2, ..., 402-M, each aggregator 404-1, 404-2, ..., 404-N, and the remote database 406 may include one or more of the following components: a central processing unit (CPU) configured to execute computer program instructions to perform various processes and methods consistent with certain disclosed embodiments, random access memory (RAM) and read only memory (ROM) configured to access and store information and computer program instructions associated with the disclosed embodiments, a memory to store data and information, databases to store tables, lists, or other data structures, I/O devices, interfaces, antennas, etc.

As shown in FIG. 4A, the WSN 400 is divided into non-overlapping clusters 408-1, 408-2, ..., 408-N, wherein the clusters 408-1, 408-2, ..., 408-N include the aggregators 404-1, 404-2, ..., 404-N, respectively, and a group of the sensor nodes 402-1, 402-2, ..., 402-M. Each sensor node 402-1, 402-2, ..., 402-M is located in a fixed position and senses certain parameters, such as temperature, pressure, or humidity, of its environment. In addition, each sensor node 402-1, 402-2, ..., 402-M has a wireless transceiver that can transmit data to the one of the aggregators 404-1, 404-2, ..., 404-N in its own cluster. Each aggregator 404-1, 404-2, ..., 404-N has a more powerful wireless transceiver than each sensor node 402-1, 402-2, ..., 402-M. The aggregators 404-1, 404-2, ..., 404-N can transmit data directly to the remote database 406 for further processing.

In one embodiment, the transmission of data by the sensor nodes 402-1, 402-2, ..., 402-M is regulated by the use of equal time windows. Each equal time window has the same length of time to provide a fair accessing mechanism for the WSN 400. Each sensor node 402-1, 402-2, ..., 402-M transmits only one digitized value of a reading of a sensed parameter in a time window. As a result, each aggregator 404-1, 404-2, ..., 404-N can receive at most one reading of the sensed parameter from each sensor node in its own cluster in the time window. In addition, telecommunication standards that utilize the same media access control mechanism (e.g., IEEE standard 802.11) may be used to provide media access fairness.

Referring also to the flowchart in FIG. 4B, before data transmission in the WSN 400, the sensor nodes 402-1, 402-2, ..., 402-M, the aggregators 404-1, 404-2, ..., 404-N, and the remote database 406 are initialized by having functions and keys pre-installed (step 412). The sensor nodes 402-1, 402-2, ..., 402-M sense certain parameters, such as temperature, pressure, or humidity, of their environment and acquire sensed data. In step 414, the sensor nodes 402-1, 402-2, ..., 402-M encrypt the sensed data with their pre-installed keys and functions. The sensor nodes 402-1, 402-2, ..., 402-M then transmit the encrypted data to their own aggregator 404-1, 404-2, ..., or 404-N in their own cluster to reduce overhead in data transmission. For example, the sensor nodes 402-1, 402-2, ..., 402-5 transmit data to the aggregator 404-1 in the cluster 408-1. Upon receiving the encrypted data from the sensor nodes in their own cluster, the aggregators 404-1, 404-2, ..., 404-N use their pre-installed functions and keys to perform data aggregation and eliminate redundant data in the encrypted data from the sensor nodes in their own cluster without decrypting the encrypted data (step 416).

FIG. 4C shows a table 430 illustrating functions and keys that may be pre-installed in the sensor nodes 402-1, 402-2, ..., 402-M, the aggregators 404-1, 404-2, ..., 404-N, and the remote database 406 in the WSN 400, according to an exemplary embodiment. Referring to FIGS. 4A and 4C, a sensor ID $SID_i$, a one-way hash function g, an initial encryption key $K_i^{EK}(0)$, and a verification key $K_i^{VK}$ may be pre-installed in each sensor node 402-1, 402-2, ..., 402-M. The verification key $K_i^{VK}$ is different for each sensor node 402-1, 402-2, ..., 402-M. The one-way hash function g has the following property:

$$g(x \oplus y) = g(x) \oplus g(y),$$

where x and y denote the keys, and "$\oplus$" denotes an exclusive OR operation, generally symbolized by XOR, on two operands. The one-way hash function g and aggregation keys may be pre-installed in each aggregator 404-1, 404-2, ..., 404-N. The aggregation keys include all of the XOR values on any two verification keys in the sensor nodes in the same cluster. The one-way hash function g, and the verification keys in the sensor nodes 402-1, 402-2, ..., 402-M are pre-installed in the remote database 406.

Figure 5:
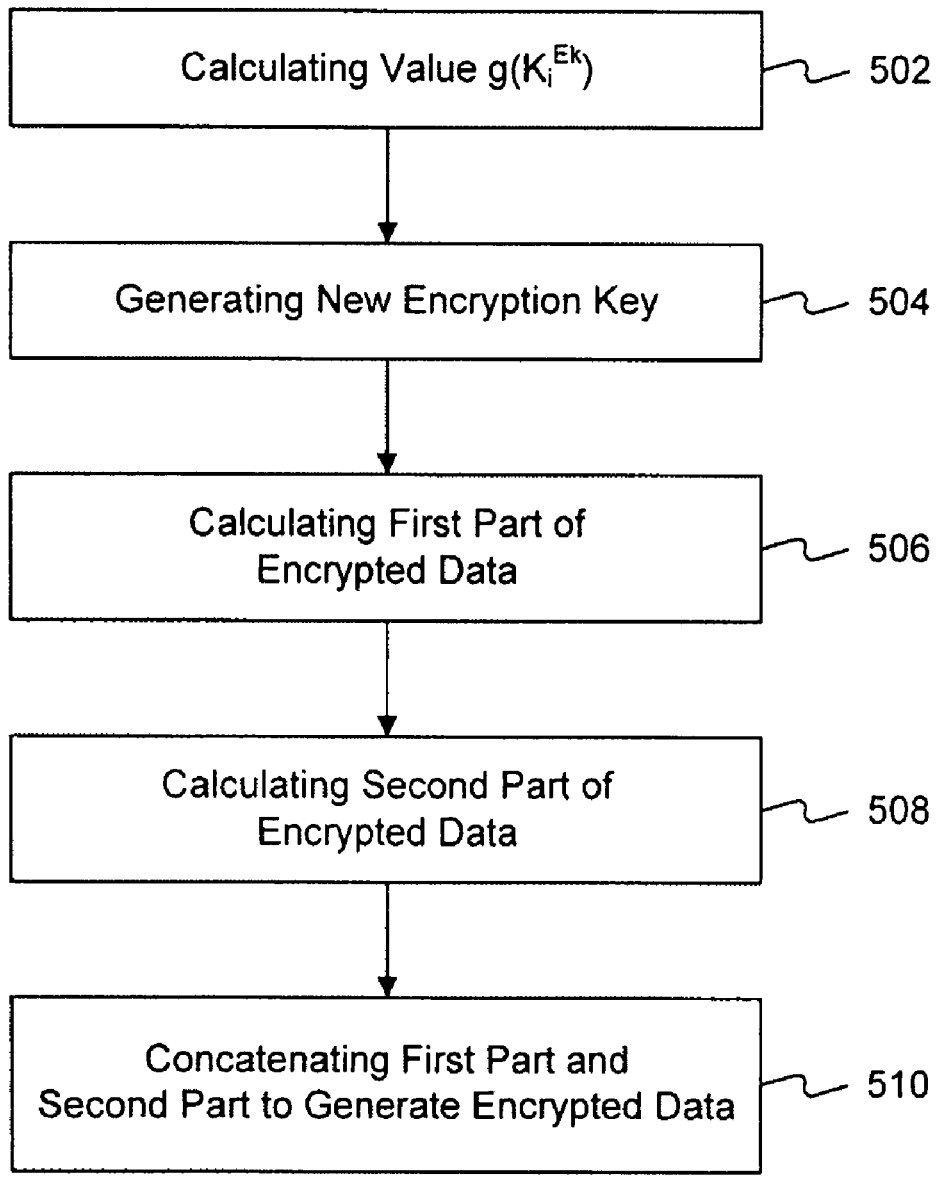
FIG. 5 illustrates a lightweight encryption method applied to a sensor node in a WSN according to an exemplary embodiment.

FIG. 5 illustrates a lightweight encryption method applied to a sensor node i in a WSN to encrypt sensed data $m_i$ according to an exemplary embodiment. For example, the sensor node i may be any one of the sensor nodes 402-1, 402-2, ..., 402-M in the WSN 400 in FIG. 4A. When the sensor node i senses certain parameters, such as temperature, pressure, or humidity, of its environment and needs to transmit the sensed data $m_i$ to an aggregator in its own cluster, it first uses its pre-installed one-way hash function g and an encryption key $K_i^{EK}$ (e.g., the initial encryption key $K_i^{EK}(0)$) to calculate a value $g(K_i^{EK})$ (step 502). The sensor node i then randomly generates a new encryption key for its next data transmission (step 504). The sensor node i further processes the sensed data $m_i$ by executing the following XOR operations:

$$m_i \oplus g(K_i^{EK}) \oplus K_i^{EK} \text{ (step 506), and}$$

$$K_i^{EK} \oplus K_i^{VK} \text{ (step 508)}$$

separately. The sensor node i then concatenates the operation results ($m_i \oplus g(K_i^{EK}) \oplus K_i^{EK}$ as a first part and $K_i^{EK} \oplus K_i^{VK}$ as a second part) to generate corresponding encrypted data $E_i(m_i)$ as follows:

$$E_i(m_i) = m_i \oplus g(K_i^{EK}) \oplus K_i^{EK} \| K_i^{EK} \oplus K_i^{VK} \text{ (step 510),}$$

where "$\|$" indicates data concatenation. Finally the sensor node i transmits the encrypted data $E_i(m_i)$ to the aggregator in its own cluster. The aggregator receives multiple encrypted data from different sensor nodes including the sensor node i in its own cluster, and uses its pre-installed functions and keys to perform data aggregation and eliminate redundant data in the multiple encrypted data without decrypting the encrypted data.

Figure 6A:
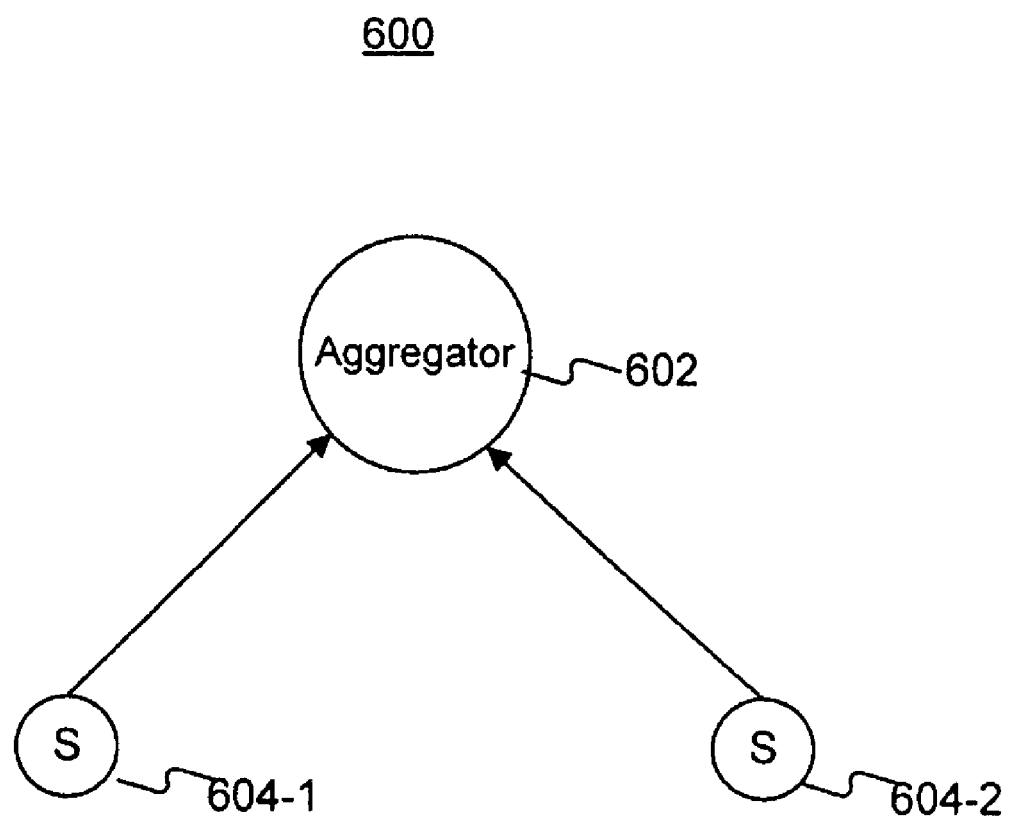
FIGS. 6A and 6B illustrate a pair-wise data eliminating method performed in an aggregator to find redundant data in encrypted data received from two sensor nodes according to an exemplary embodiment.
Figure 6B:
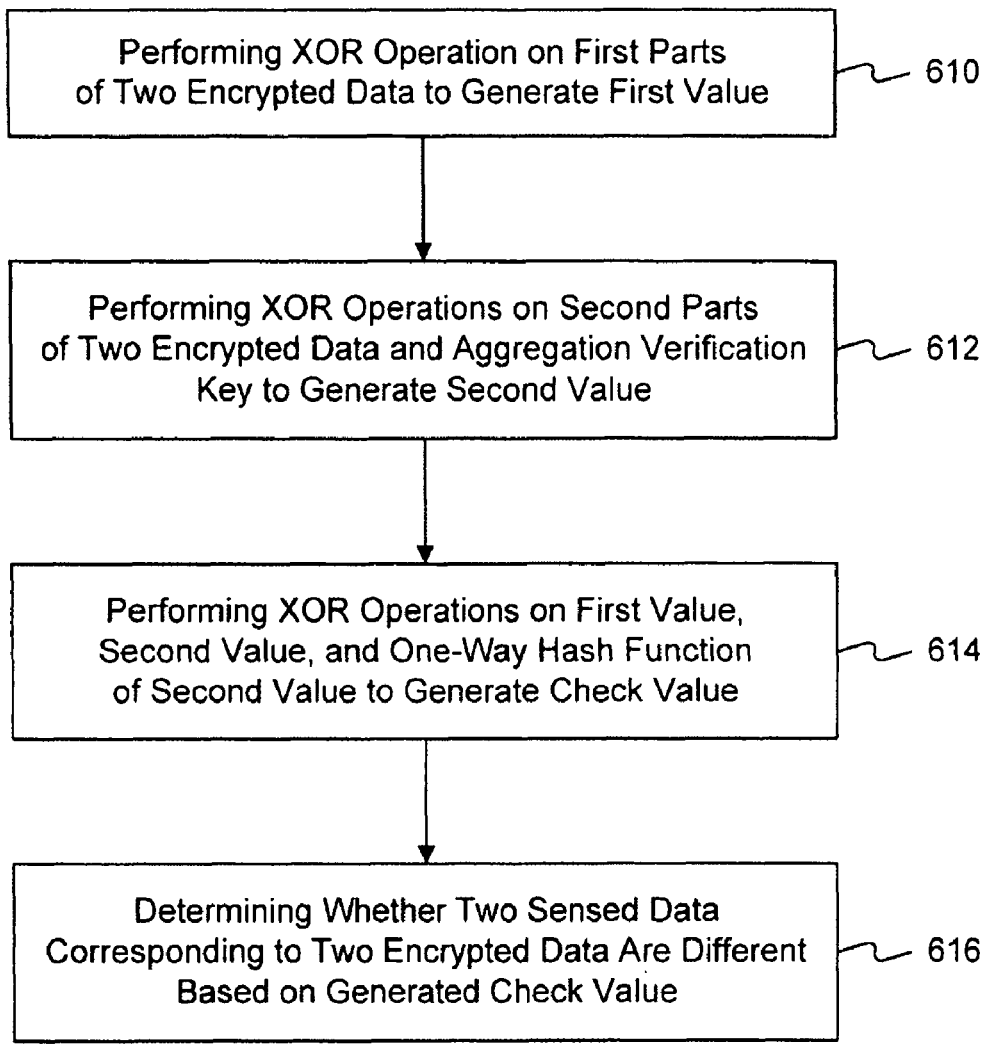

FIGS. 6A and 6B illustrate a cluster 600 and a pair-wise data eliminating method performed in an aggregator 602 in the cluster 600 to find redundant data in two encrypted data $E_i(m_i)$ and $E_j(m_j)$ received from two sensor nodes 604-1 and 604-2, respectively, without decrypting the received encrypted data, according to an exemplary embodiment. The cluster 600 includes the aggregator 602 and the two sensor nodes 604-1 and 604-2. For example, the cluster 600 could be any one of the clusters 408-1, 408-2, ..., 408-N in the WSN 400 in FIG. 4A. As noted above, the two encrypted data $E_i(m_i)$ and $E_j(m_j)$ transmitted to the aggregator 602 from the two sensor nodes 604-1 and 604-2, respectively, can be expressed as follows:

$$E_i(m_i) = m_i \oplus g(K_i^{EK}) \oplus K_i^{EK} \| K_i^{EK} \oplus K_i^{VK}, \quad \text{Equation (1)}$$

and $$E_j(m_j) = m_j \oplus g(K_j^{EK}) \oplus K_j^{EK} \| K_j^{EK} \oplus K_j^{VK}, \quad \text{Equation (2)}$$

where $m_i$ is sensed data from the sensor node 604-1, g is a pre-installed one-way hash function, $K_i^{EK}$ is an encryption key in the sensor node 604-1, $K_i^{VK}$ is a verification key in the sensor node 604-1, $m_j$ is sensed data from the sensor node 604-2, $K_j^{EK}$ is an encryption key in the sensor node 604-2, and $K_j^{VK}$ is a verification key in the sensor node 604-2. The aggregator 602 first performs an XOR operation on first parts of the two encrypted data $E_i(m_i)$ and $E_j(m_j)$ as follows (step 610):

$$m_i \oplus g(K_i^{EK}) \oplus K_i^{EK} \oplus m_j \oplus g(K_j^{EK}) \oplus K_j^{EK}. \qquad \text{Equation (3)}$$

Since aggregation keys which include all of the XOR values on any two verification keys in the sensor nodes in the same cluster are pre-installed in the aggregator 602, the aggregator 602 then performs XOR operations on second parts of the two encrypted data $E_i(m_i)$ and $E_j(m_j)$ and the aggregation key (i.e., $K_i^{VK} \oplus K_j^{VK}$) as follows (step 612):

$$K_i^{EK} \oplus K_i^{VK} \oplus K_j^{EK} \oplus K_j^{VK} \oplus K_i^{VK} \oplus K_j^{VK},$$

which is equal to:

$$K_i^{EK} \oplus K_j^{EK}. \qquad \text{Equation (4)}$$

As shown above, the aggregator 602 can use the encrypted data $E_i(m_i)$ and $E_j(m_j)$ to retrieve $K_i^{EK} \oplus K_j^{EK}$, but cannot retrieve $K_i^{EK}$ or $K_j^{EK}$ separately. Therefore the aggregator 602 cannot decrypt the encrypted data $E_i(m_i)$ and $E_j(m_j)$. As a result, data secrecy and privacy are provided for the WSN.

Next, the aggregator 602 performs XOR operations on Equation (3), Equation (4), and $g(K_i^{EK} \oplus K_j^{EK})$ to obtain a check value $V_{i,j}$ as follows (step 614):

$$V_{i,j} = m_i \oplus g(K_i^{EK}) \oplus K_i^{EK} \oplus m_j \oplus g(K_j^{EK}) \oplus K_j^{EK} \\ \oplus K_i^{EK} \oplus K_j^{EK} \oplus g(K_i^{EK} \oplus K_j^{EK}), \qquad \text{Equation (5)}$$

where the one-way hash function g is pre-installed in the aggregator 602. As noted above, the one-way hash function g has the following property:

$$g(x \oplus y) = g(x) \oplus g(y).$$

Therefore Equation (5) can be expressed as:

$$V_{i,j} = m_i \oplus g(K_i^{EK}) \oplus K_i^{EK} \oplus m_j \oplus g(K_j^{EK}) \\ \oplus K_j^{EK} \oplus K_i^{EK} \oplus K_j^{EK} \oplus g(K_i^{EK}) \oplus g(K_j^{EK}),$$

which can be further reduced to:

$$V_{i,j} = m_i \oplus g(K_i^{EK}) \oplus K_i^{EK} \oplus m_j \oplus g(K_j^{EK}) \oplus K_j^{EK} \oplus \\ K_i^{EK} \oplus K_j^{EK} \oplus g(K_i^{EK}) \oplus g(K_j^{EK}) \\ = m_i \oplus m_j \oplus g(K_i^{EK}) \oplus g(K_j^{EK}) \oplus K_i^{EK} \oplus K_i^{EK} \oplus \\ g(K_j^{EK}) \oplus g(K_j^{EK}) \oplus K_j^{EK} \oplus K_j^{EK} \\ = m_i \oplus m_j.$$

As a result, if the sensed data $m_i$ from the sensor node 604-1 is equal to the sensed data $m_j$ from the sensor node 604-2, the check value $V_{i,j}$ will be zero. Otherwise the check value $V_{i,j}$ will be one, as illustrated by the following equations:

$$V_{i,j} = 0, \text{ if } m_i = m_j,$$

$$V_{i,j} = 1, \text{ otherwise}.$$

Based on the check value $V_{i,j}$, the aggregator 602 determines whether the encrypted data $E_i(m_i)$ or $E_j(m_j)$ need to be transmitted to a remote database (not shown in FIG. 6A) in step 616. If $V_{i,j} = 0$, which means the sensed data $m_i$ from the sensor node 604-1 is equal to the sensed data $m_j$ from the sensor node 604-2, the aggregator 602 may transmit either the encrypted data $E_i(m_i)$ or $E_j(m_j)$, but not both, to the remote database to reduce data redundancy and improve bandwidth utilization. If $V_{i,j} = 1$, which means the sensed data mi from the sensor node 604-1 is different from the sensed data my from the sensor node 604-2, the aggregator 602 may transmit both the encrypted data $E_i(m_i)$ and $E_j(m_j)$ to the remote database. In one embodiment, when $V_{i,j} = 1$, the aggregator 602 may transmit a concatenation of $E_i(m_i)$ and $E_j(m_j)$, $E_i(m_i) \| E_j(m_j)$ to the remote database.

Figure 7A:
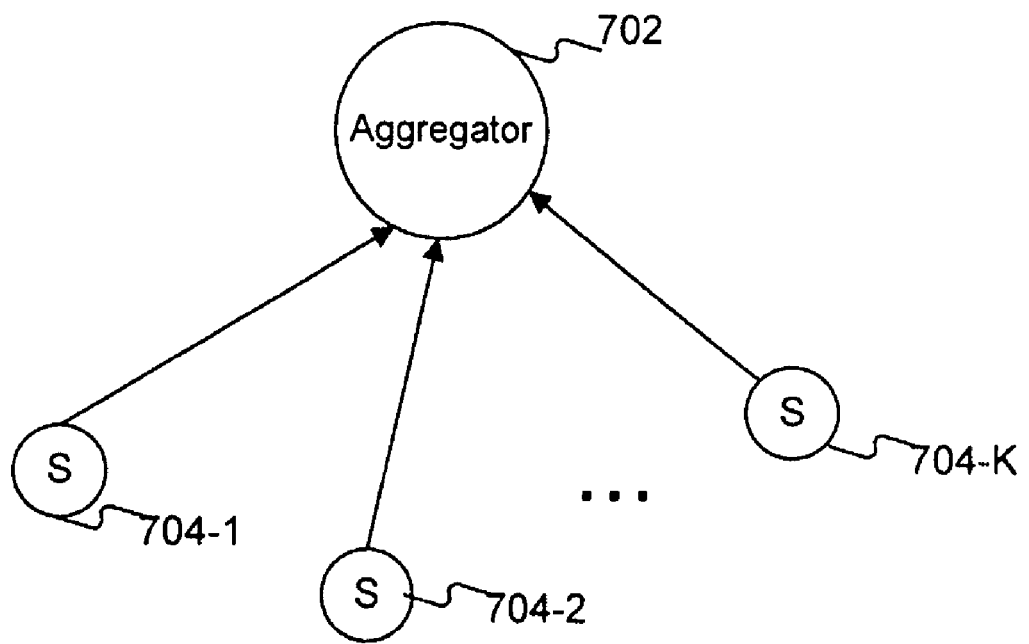
FIGS. 7A and 7B illustrate a pair-wise data eliminating method performed in an aggregator to find redundant data in encrypted data received from multiple sensor nodes according to an exemplary embodiment.
Figure 7B:
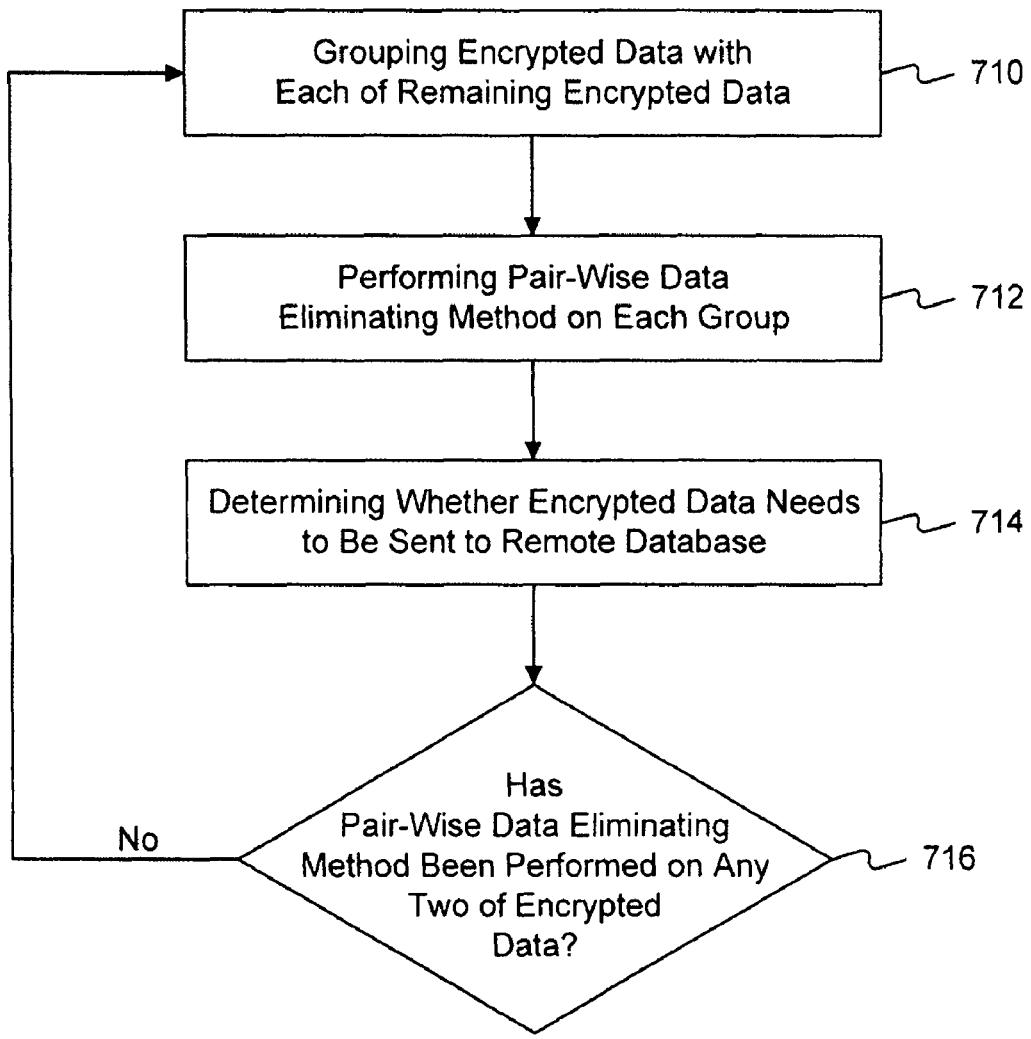

FIGS. 7A and 7B illustrate a cluster 700 and a pair-wise data eliminating method performed in an aggregator 702 in the cluster 700 to find redundant data in multiple encrypted data $E_1(m_1), E_2(m_2), \ldots, E_k(m_k)$ (K is the total number of sensor nodes in the cluster 700) received from sensor nodes 704-1, 704-2, ..., 704-K, respectively, without decrypting the multiple encrypted data, according to an exemplary embodiment. The cluster 700 includes the aggregator 702 and the multiple sensor nodes 704-1, 704-2, ..., 704-K. For example, the cluster 700 could be any one of the clusters 408-1, 408-2, ..., 408-N in the WSN 400 in FIG. 4A. The aggregator 702 first chooses the encrypted data $E_i(m_i)$ and separately groups the encrypted data $E_1(m_1)$ with each of the remaining encrypted data $E_2(m_2), E_3(m_3), \ldots, E_k(m_k)$ into pairs (step 710). For each group, the pair-wise data eliminating method described above for two encrypted data is performed in the aggregator 702 to find redundant data in two encrypted data $E_1(m_1)$ and $E_j(m_j)$ (step 712), where j is the sensor node index 2, 3, ..., K, as shown in FIG. 7A.

For example, the two encrypted data $E_1(m_1)$ and $E_j(m_j)$ transmitted to the aggregator 702 from the two sensor nodes 704-1 and 704-j, respectively, can be expressed as follows:

$$E_1(m_1) = m_1 \oplus g(K_1^{EK}) \oplus K_1^{EK} \| K_1^{EK} \oplus K_1^{VK}, \qquad \text{Equation (6)}$$

and $$E_j(m_j) = m_j \oplus g(K_j^{EK}) \oplus K_j^{EK} \| K_j^{EK} \oplus K_j^{EK}, \qquad \text{Equation (7)}$$

where $m_1$ is sensed data from the sensor node 704-1, g is a pre-installed one-way hash function, $K_1^{EK}$ is an encryption key in the sensor node 704-1, $K_1^{VK}$ is a verification key in the sensor node 704-1, $m_j$ is sensed data from the sensor node 704-j, $K_j^{EK}$ is an encryption key in the sensor node 704-j, and $K_j^{VK}$ is a verification key in the sensor node 704-j. The aggregator 702 first performs an XOR operation on first parts of the two encrypted data $E_1(m_1)$ and $E_j(m_j)$ as follows:

$$m_1 \oplus g(K_1^{EK}) \oplus K_1^{EK} \oplus m_j \oplus g(K_j^{EK}) \oplus K_j^{EK}. \qquad \text{Equation (8)}$$

Since aggregation keys which include all of the XOR values on any two verification keys in the sensor nodes in the same cluster are pre-installed in the aggregator 702, the aggregator 702 then performs XOR operations on second parts of the two encrypted data $E_1(m_1)$ and $E_j(m_j)$ and the aggregation key (i.e., $K_1^{VK} \oplus K_j^{VK}$) as follows:

$$K_1^{EK} \oplus K_1^{VK} \oplus K_j^{EK} \oplus K_j^{VK} \oplus K_1^{VK} \oplus K_j^{VK},$$

which is equal to:

$$K_1^{EK} \oplus K_j^{EK}. \qquad \text{Equation (9)}$$

As shown above, the aggregator 702 can use the encrypted data $E_1(m_1)$ and $E_j(m_j)$ to retrieve $K_1^{EK} \oplus K_j^{EK}$, but cannot retrieve $K_1^{EK}$ or $K_j^{EK}$ separately. Therefore the aggregator 702 cannot decrypt the encrypted data $E_1(m_1), E_2(m_2), \ldots, E_k(m_k)$. As a result, data secrecy and privacy are provided for the WSN.

Next, the aggregator 702 performs XOR operations on Equation (8), Equation (9), and $g(K_1^{EK} \oplus K_j^{EK})$ to obtain a check value $V_{1,j}$ as follows:

$$V_{1,j} = m_1 \oplus g(K_1^{EK}) \oplus K_1^{EK} \oplus m_j \oplus g(K_j^{EK}) \\ \oplus K_j^{EK} \oplus K_1^{EK} \oplus K_j^{EK} \oplus g(K_1^{EK} \oplus K_j^{EK}), \qquad \text{Equation (10)}$$

where the one-way hash function g is pre-installed in the aggregator 702. As noted above, the one-way hash function g has the following property:

$$g(x \oplus y) = g(x) \oplus g(y).$$

Therefore Equation (10) can be expressed as:

$$V_{1,j} = m_1 \oplus g(K_1^{EK}) \oplus K_1^{EK} \oplus m_j \oplus g(K_j^{EK})$$
$$\oplus K_j^{EK} \oplus K_1^{EK} \oplus K_j^{EK} \oplus g(K_1^{EK}) \oplus g(K_j^{EK}),$$

which can be further reduced to:

$$\begin{aligned} V_{1,j} &= m_1 \oplus g(K_1^{EK}) \oplus K_1^{EK} \oplus m_j \oplus g(K_j^{EK}) \oplus K_j^{EK} \oplus \\ &\quad K_1^{EK} \oplus K_j^{EK} \oplus g(K_1^{EK}) \oplus g(K_j^{EK}) \\ &= m_1 \oplus m_j \oplus g(K_1^{EK}) \oplus g(K_1^{EK}) \oplus K_1^{EK} \oplus K_1^{EK} \oplus \\ &\quad g(K_j^{EK}) \oplus g(K_j^{EK}) \oplus K_j^{EK} \oplus K_j^{EK} \\ &= m_1 \oplus m_j. \end{aligned}$$

As a result, if the sensed data $m_1$ from the sensor node 704-1 is equal to the sensed data $m_j$ from the sensor node 704-j, the check value $V_{1,j}$ will be zero. Otherwise the check value $V_{1,j}$ will be one, as illustrated by the following equations:

$$V_{1,j}=0, \text{ if } m_1=m_j,$$

$$V_{1,j}=1, \text{ otherwise.}$$

By calculating the check values $V_{1,2}, V_{1,3}, \ldots, V_{1,K}$ for each group, the aggregator 702 determines whether or not the encrypted data $E_1(m_1)$ is redundant and needs to be transmitted to a remote database (not shown in FIGS. 7A and 7B) (step 714).

For example, if all of the check values $V_{1,2}, V_{1,3}, \ldots, V_{1,k}$ are equal to one, which means the encrypted data $E_1(m_1)$ is different from any of the remaining encrypted data $E_2(m_2), E_3(m_3), \ldots, E_k(m_k)$, the aggregator 702 may determine the need to transmit the encrypted data $E_1(m_1)$ to the remote database. Otherwise the encrypted data $E_1(m_1)$ is eliminated.

Similarly, the aggregator 702 then chooses the next encrypted data $E_2(m_2)$ and separately groups the encrypted data $E_2(m_2)$ with each of the remaining encrypted data $E_3(m_3), E_4(m_4), \ldots, E_k(m_k)$ into pairs, to determine whether the encrypted data $E_2(m_2)$ is redundant and needs to be transmitted to the remote database. This process continues until the pair-wise data eliminating method has been performed on any two of the multiple encrypted data $E_1(m_1), E_2(m_2), \ldots, E_k(m_k)$ (step 716). By iteratively performing the pair-wise data eliminating method on two encrypted data, redundant data in the multiple encrypted data $E_1(m_1), E_2(m_2), \ldots, E_k(m_k)$ can be eliminated.

In one embodiment, the aggregator 702 receives five encrypted data from five sensor nodes. The aggregator 702 first chooses the encrypted data $E_1(m_1)$ and separately groups the encrypted data $E_1(m_1)$ with each of the remaining encrypted data $E_2(m_2), \ldots, E_5(m_5)$ into pairs. For each group, the pair-wise data eliminating method described above for two encrypted data is performed in the aggregator 702 to find redundant data in the two encrypted data $E_1(m_1)$ and $E_j(m_j)$, where j is the sensor node index 2, 3, 4, 5. By calculating check values $V_{1,2}, V_{1,3}, V_{1,4}, V_{1,5}$ for each group, the aggregator 702 determines whether or not the encrypted data $E_1(m_1)$ is redundant and needs to be transmitted to the remote database.

For example, if all of the check values $V_{1,2}, V_{1,3}, V_{1,4}, V_{1,5}$ are equal to one, which means the encrypted data $E_1(m_1)$ is different from any of the remaining encrypted data $E_2(m_2)$, $E_3(m_3), E_4(m_4), E_5(m_5)$, the aggregator 702 may determine the need to transmit the encrypted data $E_1(m_1)$ to the remote database. Otherwise the encrypted data $E_1(m_1)$ is eliminated. Similarly, the aggregator 702 then chooses the next encrypted data $E_2(m_2)$ and separately groups the encrypted data $E_2(m_2)$ with each of the remaining encrypted data $E_3(m_3), E_4(m_4), E_5(m_5)$ into pairs, to determine whether or not the encrypted data $E_2(m_2)$ is redundant and needs to be transmitted to the remote database. This process continues until the pair-wise data eliminating method has been performed on any two data in the five encrypted data $E_1(m_1), E_2(m_2), \ldots, E_5(m_5)$.

Figure 8:
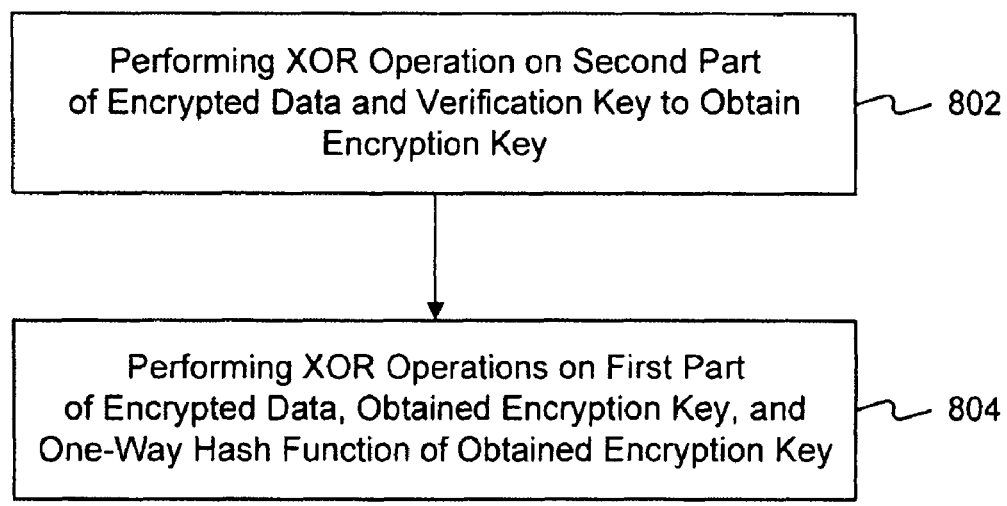
FIG. 8 illustrates a method performed in a database to decrypt the encrypted data according to an exemplary embodiment.

FIG. 8 illustrates a method performed in the database 406 in FIG. 4A to decrypt encrypted data from the aggregators 404-1, 404-2, ..., 404-N according to an exemplary embodiment. Since all verification keys in each sensor node 402-1, 402-2, ..., 402-M are pre-installed in the remote database 406, the database 406 can use the pre-installed verification keys to obtain encryption keys to the encrypted data received from the aggregators 404-1, 404-2, ..., 404-N. For example, if the database 406 needs to obtain the encryption key $K_i^{EK}$ to the encrypted data $E_i(m_i)$, which is expressed in Equation (1), the remote database 406 performs an XOR operation on the second part of $E_i(m_i)$ and the verification key $K_i^{VK}$ as follows (step 802):

$$K_i^{EK} \oplus K_i^{VK} \oplus K_i^{VK} = K_i^{EK}.$$

The database then uses the first part of $E_i(m_i)$ and the obtained encryption key $K_i^{EK}$ to decrypt the encrypted data $E_i(m_i)$ as follows (step 804):

$$m_i \oplus g(K_i^{EK}) \oplus K_i^{EK} \oplus K_i^{EK} \oplus g(K_{iEK}) = m_i,$$

where g is the one-way hash function pre-installed in the database 406.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art to which this invention and all within the limits of the appended claims. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for transmitting sensed data in a wireless sensor network including multiple sensors, the method comprising:
    encrypting the sensed data with an encryption key and a verification key to generate encrypted data in each of the multiple sensors that senses data;
    wirelessly receiving the encrypted data from the multiple sensors;
    determining that the sensed data from one of the multiple sensors is different from the sensed data from others of the multiple sensors without decrypting the encrypted data; and
    transmitting the encrypted sensed data determined to be different.

2. The method of claim 1, further including randomly generating the encryption key in each of the multiple sensors for each data encryption.

3. The method of claim 1, further including pre-installing the verification key in each of the multiple sensors.

4. The method of claim 1, further including pre-installing a different verification key for each of the multiple sensors.

5. The method of claim 1, wherein the determining comprises:
    calculating a check value for two of the encrypted data; and
    determining, based on the check value, whether the two sensed data respectively corresponding to the two encrypted data are different.

6. A method for transmitting sensed data in a wireless sensor network including multiple sensors, multiple aggregators, and a remote database, the method comprising:
    dividing the wireless sensor network into non-overlapping clusters, each of the clusters including a group of the sensors and one of the aggregators;
    encrypting, in the group of sensors, data sensed by each of the sensors in the group with an encryption key and a verification key to generate separate encrypted data for each of the sensors in the group;
    determining, in the aggregator, that the sensed data from one of the sensors in the group is different from the sensed data from others of the sensors in the group without decrypting the encrypted data; and
    transmitting the encrypted sensed data, determined to be different, to the remote database for processing.

7. The method of claim 6, further including randomly generating the encryption key in each of the sensors in the group of sensors for each data encryption.

8. The method of claim 6, further including pre-installing the verification key in each of the sensors in the group of sensors.

9. The method of claim 6, further including pre-installing a different verification key in each of the sensors in the group of sensors.

10. The method of claim 6, wherein the encrypting comprises:
    generating a first part of the encrypted data by performing $m_i \oplus g(K_i^{EK}) \oplus K_i^{EK}$, wherein $m_i$ denotes the sensed data of an $i^{th}$ one of the sensors, "$\oplus$" denotes an exclusive OR operation, g denotes a one-way hash function, and $K_i^{EK}$ denotes the encryption key;
    generating a second part of the encrypted data by performing $K_i^{EK} \oplus K_i^{VK}$, wherein $K_i^{EK}$ denotes the encryption key, "$\oplus$" denotes an exclusive OR operation, and $K_i^{VK}$ denotes the verification key; and
    concatenating the first part of the encrypted data and the second part of the encrypted data to generate the encrypted data.

11. The method of claim 6, wherein the determining comprises:
    calculating a check value for two of the encrypted data; and
    determining, based on the check value, whether the two sensed data respectively corresponding to the two encrypted data are different.

12. The method of claim 11, wherein the calculating comprises:
    performing an exclusive OR operation on first parts of the two encrypted data to generate a first value;
    performing exclusive OR operations on second parts of the two encrypted data and an aggregation key to generate a second value; and
    performing exclusive OR operations on the first value, the second value, and a one-way hash function of the second value to generate the check value.

13. The method of claim 12, further including generating the aggregation key by performing an exclusive OR operation on the verification keys of the two encrypted data.

14. The method of claim 12, further including pre-installing the aggregation key in the aggregator.

15. The method of claim 6, wherein the processing comprises:
    performing an exclusive OR operation on the verification key and a second part of the encrypted data generated from the determined sensed data to obtain the encryption key; and
    performing exclusive OR operations on the encryption key, a one-way hash function of the encryption key, and a first part of the encrypted data generated from the determined sensed data.

16. The method of claim 15, further including pre-installing the verification key in the remote database.

17. The method of claim 15, further including pre-installing the one-way hash function in the remote database.

18. A system for transmitting sensed data in a wireless sensor network including non-overlapping clusters, the system comprising:
    a group of sensors to sense data, in a cluster, each of the sensors that senses data configured to encrypt the sensed data with an encryption key and a verification key to generate encrypted data;
    an aggregator to wirelessly receive the encrypted data, in the cluster, the aggregator configured to determine that the sensed data from one of the sensors in the group of sensors is different from the sensed data from others of the sensors in the group of sensors without decrypting the encrypted data; and
    a remote database configured to wirelessly receive, from the aggregator, the encrypted sensed data determined to be different.

19. The system of claim 18, wherein each of the sensors in the group of sensors comprises a processor, and the processor
    generates a first part of the encrypted data by performing $m_i \oplus g(K_i^{EK}) \oplus K_i^{EK}$, wherein $m_i$ denotes the sensed data of an $i^{th}$ one of the sensors, "$\oplus$" denotes an exclusive OR operation, g denotes a one-way function, and $K_i^{EK}$ denotes the encryption key;
    generates a second part of the encrypted data by performing $K_i^{EK} \oplus K_i^{VK}$, wherein $K_i^{EK}$ denotes the encryption key, "$\oplus$" denotes an exclusive OR operation, and $K_i^{VK}$ denotes the verification key; and
    concatenates the first part of the encrypted data and the second part of the encrypted data to generate the encrypted data.

20. The system of claim 18, wherein the aggregator comprises a processor, and the processor
    calculates a check value for two of the encrypted data; and
    determines, based on the check value, whether the two sensed data respectively corresponding to the two encrypted data are different.

* * * * *